US011417105B1

(12) United States Patent
Soo et al.

(10) Patent No.: US 11,417,105 B1
(45) Date of Patent: *Aug. 16, 2022

(54) IDENTIFYING INDIVIDUALS WHO WITNESSED A FLEEING SUSPECT (71) Applicant: MOTOROLA SOLUTIONS, INC., Chicago, IL (US)

(72) Inventors: Swee Yee Soo, Gelugor (MY); Chun Meng Tan, Bayan Lepas (MY); Mouk Pio Kang, Bukit Mertajam (MY); Kean Aik Low, Sungai Petani (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/176,199

(22) Filed: Feb. 16, 2021

(51) Int. Cl.
*G06V 20/52* (2022.01)
*H04W 4/021* (2018.01)
*G06V 10/25* (2022.01)
*G06V 40/10* (2022.01)
*G06V 40/16* (2022.01)

(52) U.S. Cl.
CPC ............ *G06V 20/53* (2022.01); *G06V 10/25* (2022.01); *G06V 40/103* (2022.01); *G06V 40/168* (2022.01); *H04W 4/021* (2013.01)

(58) Field of Classification Search
CPC ...... G06V 20/53; G06V 10/25; G06V 40/103; G06V 40/168; G06V 40/166; G06V 40/171; G06V 40/172; G06V 40/50; G06V 40/70; H04W 4/021; G01J 5/0025; G06K 9/00771; G06K 9/00288; G06K 9/00255; G06K 9/00362; G06K 9/00; G06K 9/00228; G06K 9/00261; G06K 9/00335; G06K 2009/00322; G06K 2009/00939; G06K 9/00221; G06K 9/00281; G06K 9/2018; G06K 9/627; G08B 13/19656; G08B 13/19602; G08B 13/196; G08B 13/19628; G08B 15/002; G08B 3/10; G08B 5/36; H04N 7/186; H04N 5/33; A61B 5/01; A61B 2576/00; A61B 5/0035; A61B 5/0077; A61B 5/015; G07C 9/00; G07C 9/30; G07C 9/00563; G16H 50/30; G16H 50/80; G06N 3/0454; G06N 3/0635; G06N 3/08; G06N 3/063; H01L 27/11807; H01L 2027/11838

See application file for complete search history.

(56) References Cited

U.S. PATENT DOCUMENTS 6,917,855 B2 7/2005 Gonzalez-Banos et al.
8,751,528 B2 6/2014 Huang
(Continued)

FOREIGN PATENT DOCUMENTS

CN 110008787 A 7/2019

OTHER PUBLICATIONS

The International Search Report and the Written Opinion, corresponding patent application serial No. PCT/US2022/014193 filed Jan. 28, 2022, dated May 16, 2022, all pages.

*Primary Examiner* — Nimesh Patel (57) ABSTRACT

A method and apparatus for identifying individuals who may have witnessed a suspect is provided herein. During operation, a camera's field of view (FOV) is analyzed to determine a region within the FOV where the suspect left the FOV. Individuals entering or exiting the cameras FOV from the region will be identified, and information about their identity will be provided to an officer.

15 Claims, 5 Drawing Sheets

(56) References Cited

U.S. PATENT DOCUMENTS

| | | | |
|---|---|---|---|
| 10,645,350 B2 | 5/2020 | Titus et al. | |
| 10,708,548 B2 | 7/2020 | Rasheed et al. | |
| 11,069,225 B1* | 7/2021 | Chiam | G08B 29/186 |
| 2005/0271250 A1* | 12/2005 | Vallone | H04N 5/781 |
| | | | 382/103 |
| 2006/0184373 A1 | 8/2006 | Kumhyr | |
| 2007/0189585 A1* | 8/2007 | Sukegawa | G07C 9/37 |
| | | | 382/118 |
| 2016/0157074 A1* | 6/2016 | Joao | G08B 21/0269 |
| | | | 455/404.2 |
| 2019/0236342 A1* | 8/2019 | Madden | G06V 40/161 |
| 2019/0333233 A1* | 10/2019 | Hu | G08B 21/182 |
| 2020/0020160 A1 | 1/2020 | Tov et al. | |
| 2020/0151326 A1* | 5/2020 | Patrich | G06F 21/554 |
| 2020/0221054 A1* | 7/2020 | Carey | G06V 40/23 |

* cited by examiner

IDENTIFYING INDIVIDUALS WHO WITNESSED A FLEEING SUSPECT

BACKGROUND OF THE INVENTION

Oftentimes police officers use the publics' help in locating fleeing suspects in a crime. For example, a suspect in a bank robbery may have fled down a street with an officer in pursuit. When the suspect leaves the officer's view (e.g., rounds a corner), often times the officer is left to guess where the suspect fled. This leads to the officer oftentimes asking people nearby if they witnessed the suspect, and if so, what direction the suspect fled. In crowded spaces, there may be several people who saw the suspect flee, however identifying them can consume critical time in apprehending the suspect. Therefore, it would be beneficial if a quicker way to identify individuals that witnessed a fleeing suspect.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a method and apparatus for identifying individuals who may have witnessed a suspect is provided herein. During operation, a camera's field of view (FOV) is analyzed to determine a region within the FOV where the suspect left the FOV. Individuals entering or exiting the camera's FOV from the region will be identified, and information about their identity will be provided to an officer.

For example, assume a suspect in a crime was fleeing and identified leaving a camera's FOV at a particular region. Three seconds later, another individual is spotted by the camera entering or exiting the FOV at the same region. Details identifying the individual will be acquired and provided to appropriate police officers in the area so that the police officers may be able to question the individual about the suspect's potential direction of travel or add the individual into Be On Look Out (BOLO) list. (Under a certain scenario, the individual might also have participated in the crime since they are travelling along the same path. Therefore, any mention below of determining various individuals that leave or enter a FOV may also be applied to determining objects that leave or enter the FOV.

The above technique can be applied to objects as well. For example, assume that a vehicle used in a crime (i.e., an object) was fleeing and identified leaving a camera's FOV at a particular region. Three seconds later, another vehicle is spotted by the camera entering or exiting the FOV at the same region. Details identifying the vehicle as an Object Of Interest (OOI) will be acquired and provided to appropriate police officers in the area so that the police officers may be able to add the OOI into BOLO list. Thus, it should be noted that in the text below, any mention of tracking or identifying individual, may be applied to tracking or identifying an object.

Figure 1:
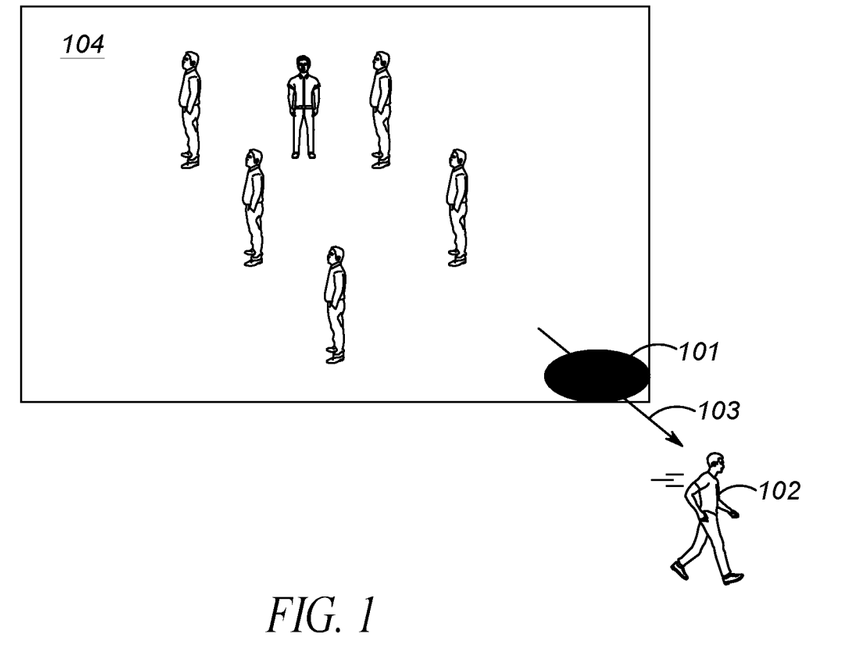
FIG. 1 illustrates a suspect and potential witnesses.
Figure 2:
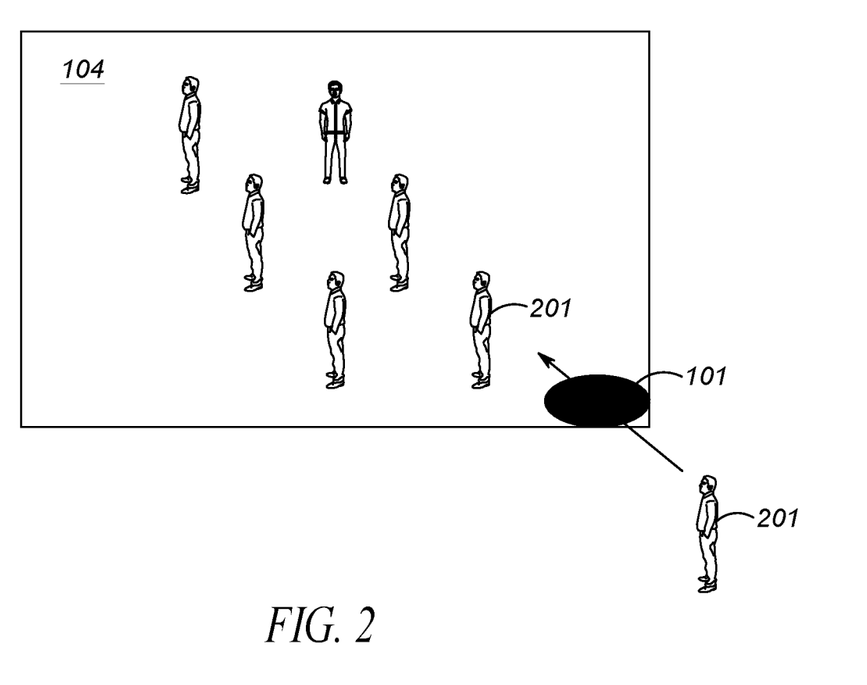
FIG. 2 illustrates a suspect and potential witnesses.

The above scenario is illustrated in FIG. 1 through FIG. 5. As shown in FIG. 1, suspect 102, traveling on path 103 has left a camera's FOV 104 at region 101 (region 101 may be a physical area). There are many potential witnesses in the camera's FOV. As shown in FIG. 2, at a later time, individual 201 has entered the cameras FOV 104 at region 101. When this happens, identifying characteristics (e.g., gender, type of clothes, color of clothes, height, weight, ethnicity, . . . , etc.) of witness 201 will be obtained and provided to any police officer in the area.

Figure 3:
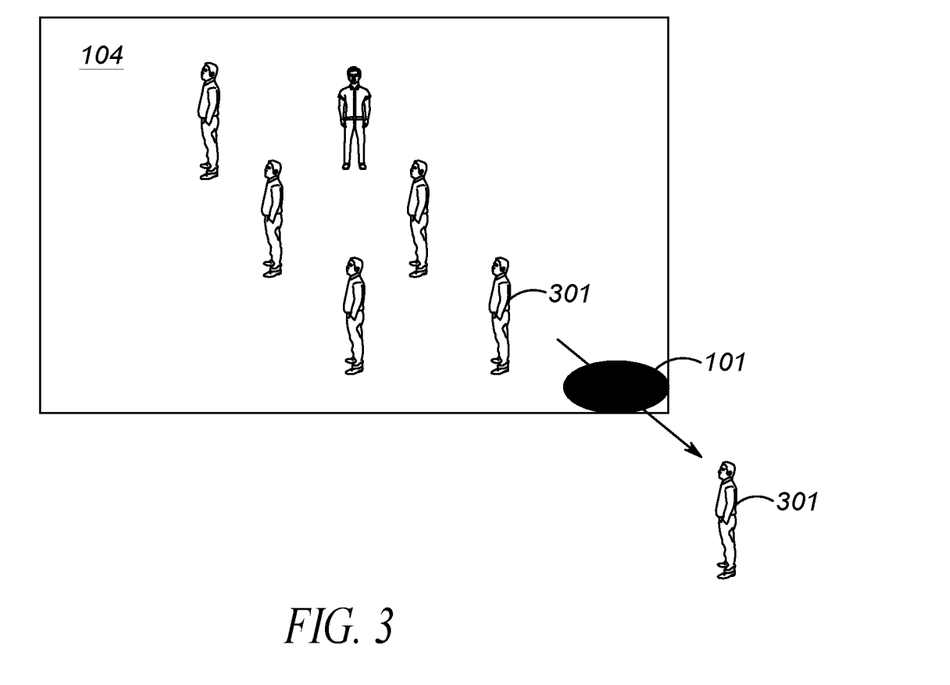
FIG. 3 illustrates a suspect and potential witnesses.

As shown in FIG. 3, the above technique may also be applied to individuals leaving the camera's FOV 104 at region 101, such that any individual 301 that leaves FOV 104 at region 101 will also have identifying characteristics obtained and provided to police officers. Thus, when the individual approaches region 101, identifying characteristics are obtained. When the individual leaves FOV at region 101 the identifying characteristics are provided to police officers.

Figure 4:
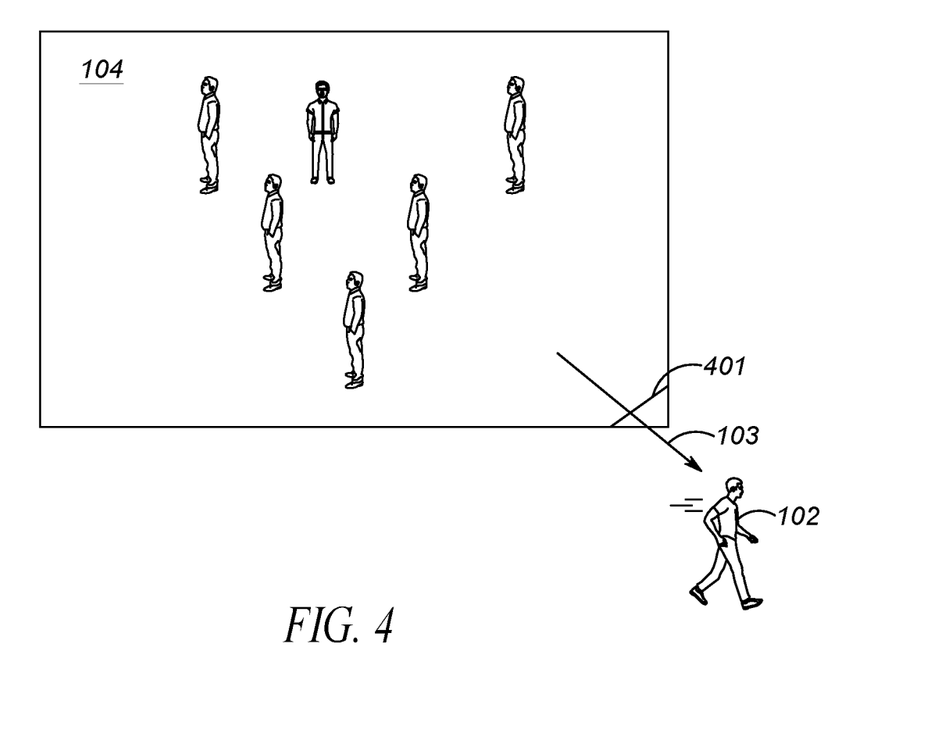
FIG. 4 illustrates a suspect and potential witnesses.

In one embodiment of the present invention, a determination is made as to whether an individual entered or exited FOV 104 at a particular region/area by placing a geofence near a region that the suspect exited the camera's FOV. This is illustrated in FIG. 4. As shown in FIG. 4, suspect 102 has left FOV 104 at region 101 (region 101 not shown in FIG. 4). In response, a linear geofence 401 is placed approximately perpendicular to path 103 and serves as a virtual trip wire. Any individual who crosses the virtual trip wire (geofence 401) will have identifying characteristics obtained and provided to police officers.

Figure 5:
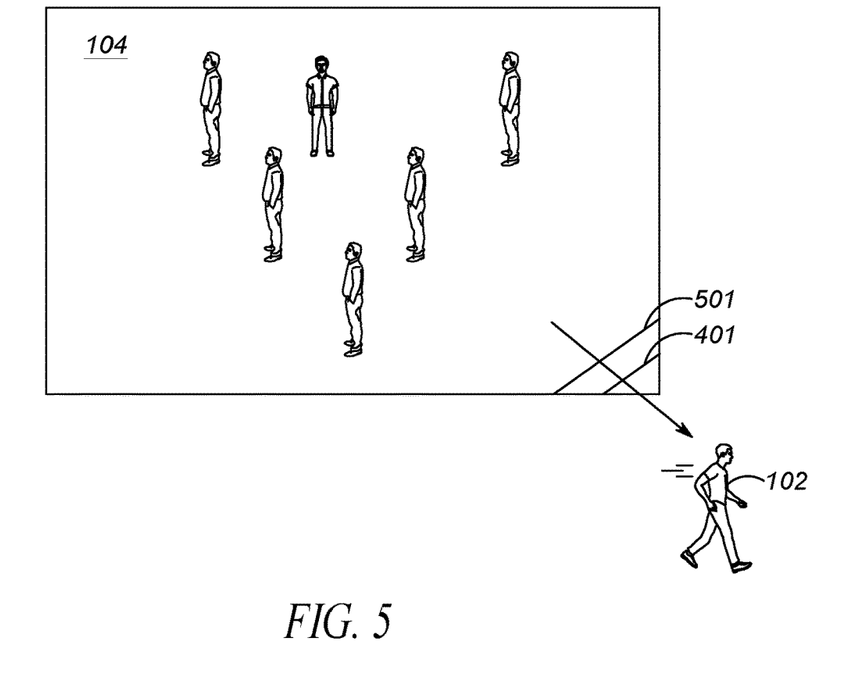
FIG. 5 illustrates a suspect and potential witnesses.

In another embodiment, it may be beneficial to determine a direction of travel of any witness who crosses the virtual trip wire to determine if the witness was traveling in the same direction, or an opposite direction to suspect 102. In order to determine this information, a second virtual trip wire may be placed substantially parallel to the first virtual trip wire in order to determine a direction of travel of any witness. This is illustrated in FIG. 5 where second virtual trip wire 501 was place parallel to virtual trip wire 401. All witnesses crossing virtual trip wire 501 first will be determined to be travelling in the same direction as suspect 102, while those crossing virtual trip wire 401 first will be determined to be travelling in an opposite direction as suspect 102.

In another embodiment, witness crossing virtual trip wire 501 first will be travelling in the same direction as suspect 102, will be added into BOLO list of all policing asset in order to track down the witness. In a chase case where the police lost the suspect in view might also lost the witness in view. Adding the witness into the BOLO list of all policing asset (for example, video surveillance tracking/ nearby other police /trusted ally agencies/ social media webpage) would be helpful in finding back the witness for further assistance.

Figure 6:
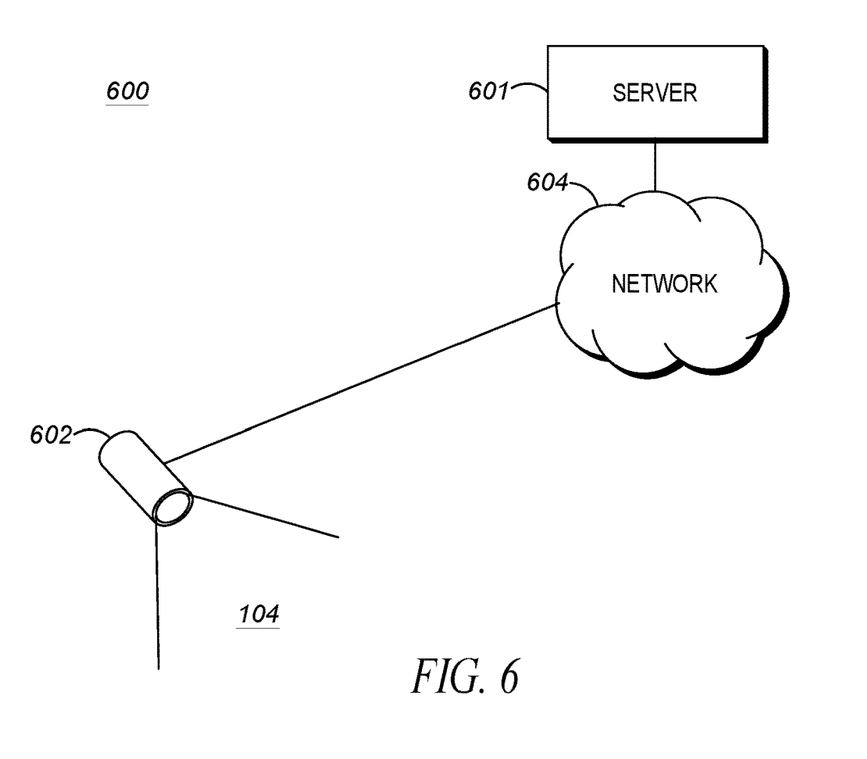
FIG. 6 illustrates an operational environment for the present invention.

FIG. 6 illustrates a general operating environment 600 of the present invention. As shown, environment 600 is equipped with at least one camera 602 positioned to capture individuals as they roam through FOV 104.

Each camera 602 has a spatial area that the camera can view, referred to as a view shed or FOV 104. The view shed is based on the geographical location of the camera, mounting height, and pan-tilt-zoom capabilities of the camera while also accounting for physical obstructions of the field of view.

Server 601 is provided. Server 601 is configured to identify a suspect, track the suspect, determine a region the suspect left a FOV 104 of camera 602, determine individuals entering or exiting FOV 104 at the region, determine identifying characteristics of the individuals, and provide police officers with those identifying characteristics. In order to accomplish this, server 601 may serve as a geofence server placing at least one geofence in an area of a camera's FOV as described above.

Cameras 602 are attached (i.e., connected) to server 601 through network 604 via network interface. Example networks include any combination of wired and wireless networks, such as Ethernet, T1, Fiber, USB, IEEE 802.11, 3GPP LTE, and the like. During operation, server 601 receives video feeds from cameras 602.

Server 601 may be a separate device or may lie internal to other network equipment. Server 601 is configured to maintain a database of geofences. Geofence definitions maintained by server 601 may include wayregions, GPS coordinates such as a latitude and longitude pair, or some other form of cartographic definition. Further, geofence definitions may include of a set of one or two parallel lines. Other possibilities exist as well.

In addition to geofence definitions, server 601 is configured to maintain a database of identifying characteristics of a suspect so that the suspect may be identified and tracked. Server 601 is also configured to maintain a database of identifying characteristics of potential witnesses that enter or exit a FOV at a region/area where the suspect exited the FOV.

Figure 7:
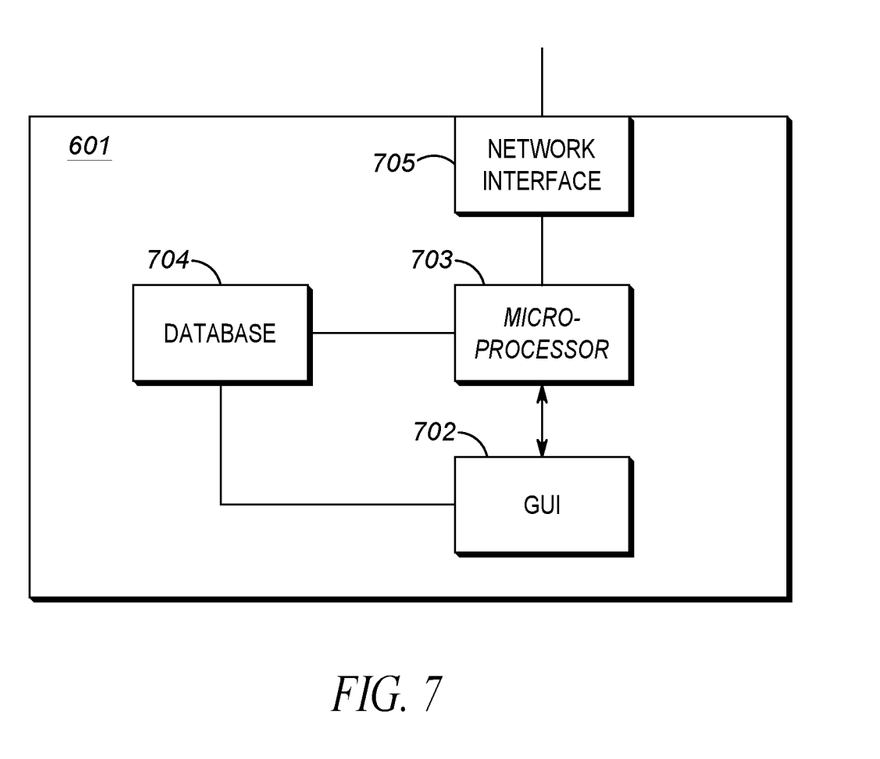
FIG. 7 is a block diagram of the server of FIG. 6.

FIG. 7 is a block diagram of sever 601 of FIG. 6. As shown, server 601 comprises logic circuitry 703, database 704, graphical-user interface (GUI) 702, and network interface 705. FIG. 7 shows those components (not all necessary) for server 601 to determine witnesses as described above. In other implementations, server 601 may include more, fewer, or different components. Regardless, all components are connected via common data busses as known in the art.

Database 704 may function to store definitions that define a geofence, and store biometric information that identifies a suspect and witnesses (e.g., facial recognition data, clothing information, gender information, height information, . . . , etc.). For example, database 704 may store a first geofence definition defining a first geofence and a second geofence definition associated with a second geofence. Database 704 may also store biometric data on a suspect and biometric data on individuals leaving a FOV. With this in mind, database 704 comprises standard memory (such as RAM, ROM, . . . , etc.). Biometric information stored for each individual can be used to visually identify the individuals.

For example, any identifying metric such as facial recognition metrics may be stored for individuals, or alternatively, an image of each individual may be stored in database 704. Regardless of the information stored in database 704, database 704 comprises information/data used to visually identify suspects and individuals.

It should be noted that in order for the above technique to take place, a suspect must be identified and tracked so that the region where they left the FOV can be determined. In one embodiment of the present invention, database is populated with identifying characteristics of a suspect, such as biometric information. The identifying characteristics of a suspect may be populated into database 704 by having a user input the information into database 704 (e.g. input information such as past facial image(s), driver's license photo, passport photo, image taken at a crime scene, . . . , etc.). This information may be obtained by an operator from various sources such as public databases, private databases, captured crime scene images, . . . , etc. In order to facilitate this, GUI 702 provides a man/machine interface for displaying and inputting information. For example, GUI 702 may provide a way of inputting facial-recognition data of a suspect to database 704 and/or to logic circuitry 703. GUI 702 may comprise any combination of a touch screen, a video camera, or any other means for supplying database 704 with data and providing this data to logic circuitry 703.

Network interface 705 includes elements including processing, modulating, and transceiver elements that are operable in accordance with any one or more standard or proprietary wireless interfaces, wherein some of the functionality of the processing, modulating, and transceiver elements may be performed by means of the processing device 703 through programmed logic such as software applications or firmware stored on database 704 or through hardware. Examples of network interfaces (wired or wireless) include Ethernet, T1, USB interfaces, IEEE 802.11b, IEEE 802.11g, etc. Network interface 705 serves as means for logic circuitry 703 to obtain image/video data from cameras 602. Network interface 705 also serves as means for logic circuitry 703 to provide identifying characteristics of witnesses to relevant officers.

Finally, logic circuitry 703 comprises a digital signal processor (DSP), general purpose microprocessor, a programmable logic device, or application specific integrated circuit (ASIC) and is configured to identify a suspect, track the suspect, identify a region where the suspect left a FOV, determine witnesses that entered or exited the FOV at the region, determine identifying characteristics of witnesses, and provide the identifying characteristics to police officers.

Thus, FIG. 7 illustrates an apparatus comprising a network interface configured to receive a video feed, and a database configured to store identification data of an object or suspect. The apparatus shown in FIG. 7 also comprises logic circuitry configured to track the object or suspect by using the identification data and the video feed, determine a region where the object or suspect left a camera's field of view (FOV), determine an individual or another object entered or left the camera's FOV near the region where the object or suspect left the camera's FOV, determine identifying characteristics of the individual or another object who entered or left the camera's FOV near the region where the object or suspect left the camera's FOV, and provide the identifying characteristics of the individual or another object to a public-safety officer.

As described above, the logic circuitry may determine the individual or another object entered or left the camera's FOV near the region where the object or suspect left the camera's FOV by determining that the individual or another object crossed the first virtual trip wire.

Additionally, the logic circuitry can further be configured to place a first virtual trip wire near the region where the object or suspect left the camera's FOV, place a second virtual trip wire near the region where the object or suspect left the camera's FOV, and determine if the individual or another object entered or left the camera's FOV is entering or leaving the camera's FOV by determining an order in which the first and the second virtual trip wire were crossed by the individual or the another object.

As discussed above, the first and the second virtual trip wires may comprise a first and a second geofence.

A GUI may be provided, wherein the logic circuitry provides the identifying characteristics of the individual or another object to a police officer by displaying a picture of the individual on the GUI.

The logic circuitry may provide the identifying characteristics of the individual or another object to a police officer by sending a picture of the individual to the public-safety officer via the network interface. The identification data may comprise facial-recognition data.

Finally, the logic circuitry may provide the identifying characteristics of the individual or another object to a police officer by adding characteristics of the individual or another object to a be-on-the-lookout (BOLO) list.

Figure 8:
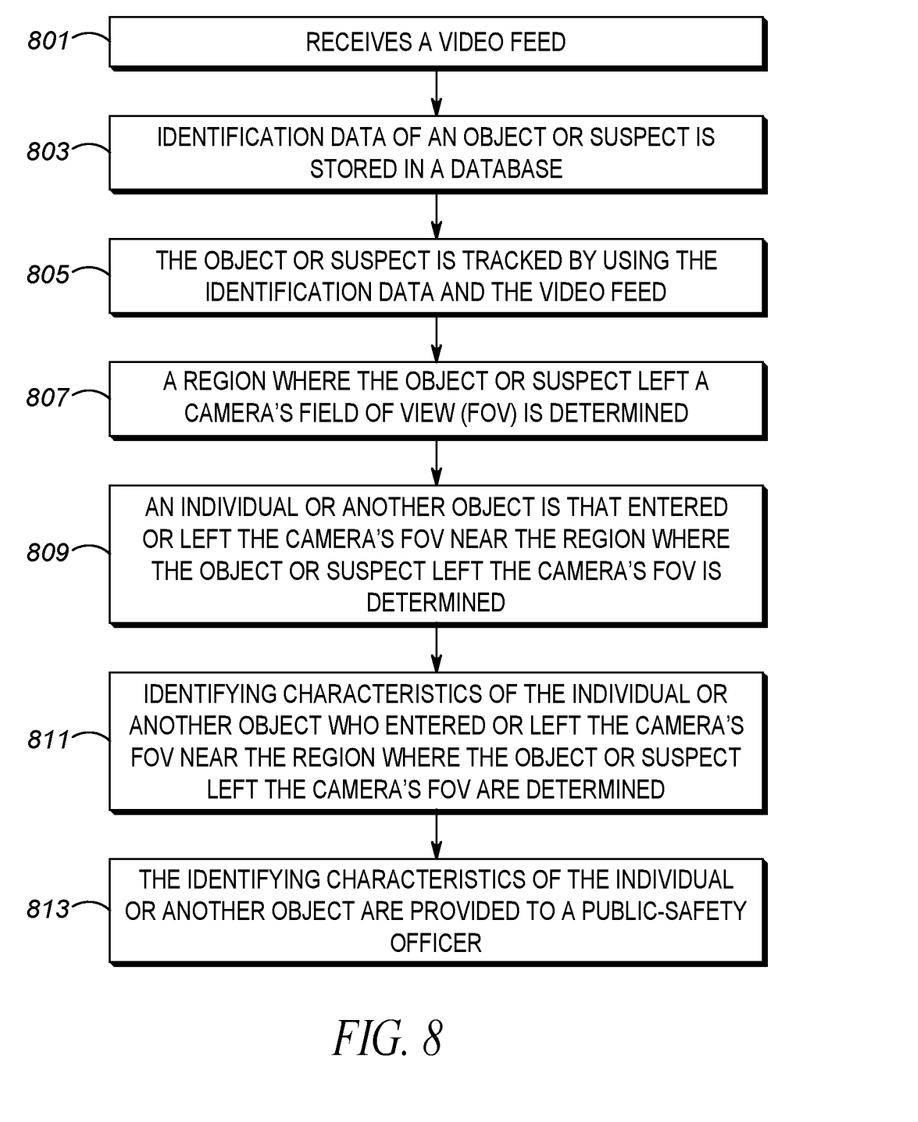
FIG. 8 is flow chart showing operation of the server of FIG. 6.

FIG. 8 is a flow chart showing a method for operating server 601. The logic flow begins at step 801 where a network interface receives a video feed. At step 803 identification data of an object or suspect is stored in a database.

At step 805, the object or suspect is tracked by using the identification data and the video feed and a region where the object or suspect left a camera's field of view (FOV) is determined (step 807).

At step 809 an individual or another object is that entered or left the camera's FOV near the region where the object or suspect left the camera's FOV is determined, and identifying characteristics of the individual or another object who entered or left the camera's FOV near the region where the object or suspect left the camera's FOV are determined (step 811).

At step 813, the identifying characteristics of the individual or another object are provided to a public-safety officer.

As discussed above, although not shown in FIG. 8, in another embodiment of the present invention, a step of placing a virtual trip wire near the region where the object or suspect left the camera's FOV may take place. When this takes place, the step of determining the individual or another object entered or left the camera's FOV near the region where the object or suspect left the camera's FOV comprises the step of determining that the individual or another object crossed the first virtual trip wire.

In yet another embodiment, the logic flow of FIG. 8 may include the steps of placing a second virtual trip wire near the region where the object or suspect left the camera's FOV. When this happens, a determination can be made if the individual or another object entered or left the camera's FOV is entering or leaving the camera's FOV by determining an order in which the first and the second virtual trip wire were crossed by the individual or the another object.

In yet another embodiment, the step of providing the identifying characteristics of the individual or another object to a police officer is accomplished by displaying a picture of the individual on a graphical-user interface.

As discussed above, the identifying characteristics of the individual or another object may be provided to a police officer by adding characteristics of the individual or another object to a be-on-the-lookout (BOLO) list.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a network interface configured to receive a video feed;
   a database configured to store identification data of an object or suspect; and
   logic circuitry configured to;
      track the object or suspect by using the identification data and the video feed;
      determine a region where the object or suspect left a camera's field of view (FOV);
      determine an individual or another object entered or left the camera's FOV near the region where the object or suspect left the camera's FOV;
      determine identifying characteristics of the individual or another object who entered or left the camera's FOV near the region where the object or suspect left the camera's FOV; and
      provide the identifying characteristics of the individual or another object to a public-safety officer.

2. The apparatus of claim 1 wherein the logic circuitry is further configured to;
   place a first virtual trip wire near the region where the object or suspect left the camera's FOV; and
   wherein the logic circuitry determines the individual or another object entered or left the camera's FOV near the region where the object or suspect left the camera's FOV by determining that the individual or another object crossed the first virtual trip wire.

3. The apparatus of claim 2 wherein the logic circuitry is further configured to:
   place a second virtual trip wire near the region where the object or suspect left the camera's FOV; and
   determine if the individual or another object entered or left the camera's FOV is entering or leaving the camera's FOV by determining an order in which the first and the second virtual trip wire were crossed by the individual or the another object.

4. The apparatus of claim 3 wherein the first and the second virtual trip wires comprises a first and a second geofence.

5. The apparatus of claim 1 further comprising a graphical-user interface (GUI), and wherein the logic circuitry provides the identifying characteristics of the individual or another object to a police officer by displaying a picture of the individual on the GUI.

6. The apparatus of claim 1 wherein the logic circuitry provides the identifying characteristics of the individual or another object to a police officer by sending a picture of the individual to the public-safety officer via the network interface.

7. The apparatus of claim 1 wherein the identification data comprises facial-recognition data.

8. The apparatus of claim 1 wherein the logic circuitry provides the identifying characteristics of the individual or another object to a police officer by adding characteristics of the individual or another object to a be-on-the-lookout (BOLO) list.

9. A method comprising steps of:
   receiving a video feed;
   storing identification data of an object or suspect;
   tracking the object or suspect by using the identification data and the video feed;
   determining a region where the object or suspect left a camera's field of view (FOV);
   determining an individual or another object entered or left the camera's FOV near the region where the object or suspect left the camera's FOV;
   determining identifying characteristics of the individual or another object who entered or left the camera's FOV near the region where the object or suspect left the camera's FOV; and
   providing the identifying characteristics of the individual or another object to a public-safety officer.

10. The method of claim 9 further comprising the steps of:
    placing a first virtual trip wire near the region where the object or suspect left the camera's FOV; and
    wherein the step of determining the individual or another object entered or left the camera's FOV near the region where the object or suspect left the camera's FOV comprises the step of determining that the individual or another object crossed the first virtual trip wire.

11. The method of claim 10 further comprising the steps of:
    placing a second virtual trip wire near the region where the object or suspect left the camera's FOV; and
    determining if the individual or another object entered or left the camera's FOV is entering or leaving the camera's FOV by determining an order in which the first and the second virtual trip wire were crossed by the individual or the another object.

12. The method of claim 11 wherein the first and the second virtual trip wires comprises a first and a second geofence.

13. The method of claim 9 further comprising the step of providing the identifying characteristics of the individual or another object to a police officer by displaying a picture of the individual on a graphical-user interface.

14. The method of claim 9 wherein the step of providing the identifying characteristics of the individual or another object to a police officer comprises the step of sending a picture of the individual to the public-safety officer.

15. The method of claim 9 wherein the identification data comprises facial-recognition data.

\* \* \* \* \*